US012444375B2

(12) United States Patent
Xu et al.

(10) Patent No.: US 12,444,375 B2
(45) Date of Patent: Oct. 14, 2025

(54) DISPLAY COMPENSATION METHOD AND LIQUID CRYSTAL DISPLAY DEVICE

(71) Applicant: TCL China Star Optoelectronics Technology Co., Ltd., Shenzhen (CN)

(72) Inventors: Ling Xu, Shenzhen (CN); Xinhong Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/799,661

(22) PCT Filed: Jul. 22, 2022

(86) PCT No.: PCT/CN2022/107225
§ 371 (c)(1),
(2) Date: Aug. 13, 2022

(87) PCT Pub. No.: WO2024/011652
PCT Pub. Date: Jan. 18, 2024

(65) Prior Publication Data

US 2025/0131890 A1 Apr. 24, 2025

(30) Foreign Application Priority Data

Jul. 14, 2022 (CN) ......................... 202210831681.0

(51) Int. Cl.
*G09G 3/34* (2006.01)
*G09G 3/20* (2006.01)

(52) U.S. Cl.
CPC ......... *G09G 3/3426* (2013.01); *G09G 3/2007* (2013.01); *G09G 2320/0233* (2013.01); *G09G 2320/066* (2013.01); *G09G 2360/16* (2013.01)

(58) Field of Classification Search
CPC ..... G09G 3/2007; G09G 3/3406–3426; G09G 2320/0233; G09G 2360/16
See application file for complete search history.

(56) References Cited

U.S. PATENT DOCUMENTS 10,074,318 B2 * 9/2018 Zhang .................. G09G 3/3426
10,127,867 B2 * 11/2018 Zhang .................. G09G 3/3426
(Continued)

FOREIGN PATENT DOCUMENTS

CN 105139809 A 12/2015
CN 106991987 A 7/2017
(Continued)

OTHER PUBLICATIONS

International Search Report in International application No. PCT/CN2022/107225, mailed on Dec. 28, 2022.
(Continued)

*Primary Examiner* — Gene W Lee
(74) *Attorney, Agent, or Firm* — Nathan & Associates Patent Agents Ltd.; Menachem Nathan

(57) ABSTRACT

The present application discloses a display compensation method and a liquid crystal display device. The display compensation method adjusts backlight brightness corresponding to backlight partitions by a backlight compensation table, therefore can roughly adjust a brightness difference of the display panel, and can also improve a contrast of a screen image, which advantages for guaranteeing grayscale transition continuity of a screen image; also, adjusting by a display compensation table adjusts grayscale data corresponding to the display partitions can achieve fine adjustment of the brightness difference of the display panel such that uniformity of the display brightness can be further increased.

17 Claims, 9 Drawing Sheets

(56) References Cited

U.S. PATENT DOCUMENTS

| | | | | |
|---|---|---|---|---|
| 10,235,946 | B2 * | 3/2019 | Zhang | G09G 3/3426 |
| 10,360,868 | B2 * | 7/2019 | Liu | G09G 3/3426 |
| 10,650,758 | B2 * | 5/2020 | Zha | G09G 3/342 |
| 11,308,897 | B2 * | 4/2022 | Shi | G09G 3/342 |
| 11,984,087 | B2 * | 5/2024 | Nam | G09G 3/342 |
| 2019/0228722 | A1 | 7/2019 | Jeong et al. | |
| 2023/0274710 | A1 * | 8/2023 | Chen | G09G 3/32<br>345/690 |

FOREIGN PATENT DOCUMENTS

| | | | |
|---|---|---|---|
| CN | 108257562 | A | 7/2018 |
| CN | 109064995 | A | 12/2018 |
| CN | 109712592 | A | 5/2019 |
| CN | 111402825 | A | 7/2020 |
| CN | 112116894 | A | 12/2020 |
| CN | 113763892 | A | 12/2021 |

OTHER PUBLICATIONS

Written Opinion of the International Search Authority in International application No. PCT/CN2022/107225, mailed on Dec. 28, 2022.

Chinese Office Action issued in corresponding Chinese Patent Application No. 202210831681.0 dated Mar. 26, 2025, pp. 1-9.

* cited by examiner

| | | Lv(cd/m²) | x | y | ΔE | | Lv(cd/m²) | x | y | ΔE | | Lv(cd/m²) | x | y | ΔE | | Lv(cd/m²) | x | y | ΔE |
|---|---|---|---|---|---|---|---|---|---|---|---|---|---|---|---|---|---|---|---|---|
| Initial bright chroma and perceivable difference ΔE | 1 | 3.429 | 0.2849 | 0.2924 | 0.00 | 1 | 26.263 | 0.289 | 0.298 | 0.00 | 1 | 145.75 | 0.2865 | 0.2964 | 0.00 | 1 | 580.26 | 0.2862 | 0.297 | 0.00 |
| | 2 | 3.7621 | 0.2778 | 0.2809 | 1.90 | 2 | 24.366 | 0.2865 | 0.2933 | 1.23 | 2 | 133.05 | 0.2863 | 0.2949 | 2.05 | 2 | 538.92 | 0.2843 | 0.2961 | 1.64 |
| | 3 | 5.3315 | 0.2757 | 0.2783 | 2.83 | 3 | 28.401 | 0.2860 | 0.2919 | 1.55 | 3 | 138.46 | 0.2863 | 0.2945 | 1.05 | 3 | 548 | 0.285 | 0.2973 | 1.29 |
| | 4 | 4.3037 | 0.276 | 0.2727 | 2.73 | 4 | 26.201 | 0.2841 | 0.2871 | 1.32 | 4 | 136.31 | 0.2884 | 0.2899 | 2.22 | 4 | 543.78 | 0.2834 | 0.2932 | 1.73 |
| | 5 | 3.7731 | 0.2817 | 0.2889 | 0.84 | 5 | 26.568 | 0.2883 | 0.297 | 2.6 | 5 | 146.09 | 0.2869 | 0.296 | 0.39 | 5 | 572.23 | 0.2852 | 0.2962 | 0.54 |
| | 6 | 4.1266 | 0.2808 | 0.2876 | 1.09 | 6 | 29.714 | 0.2871 | 0.2969 | 1.11 | 6 | 147.22 | 0.2869 | 0.2962 | 0.37 | 6 | 574.67 | 0.2847 | 0.2958 | 0.57 |
| | 7 | 9.7590 | 0.2786 | 0.3044 | 3.84 | 7 | 40.946 | 0.2811 | 0.2868 | 3.80 | 7 | 163.59 | 0.2865 | 0.2924 | 2.27 | 7 | 582.19 | 0.2846 | 0.2940 | 1.80 |
| | 8 | 9.3972 | 0.2791 | 0.3046 | 5.61 | 8 | 40.879 | 0.2811 | 0.285 | 5.36 | 8 | 162.68 | 0.2869 | 0.2914 | 2.71 | 8 | 583.03 | 0.2844 | 0.2931 | 1.75 |
| | 9 | 10.46 | 0.2767 | 0.281 | 4.48 | 9 | 43.196 | 0.2794 | 0.2824 | 6.55 | 9 | 164.38 | 0.2858 | 0.291 | 3.34 | 9 | 587.69 | 0.284 | 0.2923 | 1.88 |

| | | Lv(cd/m²) | x | y | ΔE | | Lv(cd/m²) | x | y | ΔE | | Lv(cd/m²) | x | y | ΔE | | Lv(cd/m²) | x | y | ΔE |
|---|---|---|---|---|---|---|---|---|---|---|---|---|---|---|---|---|---|---|---|---|
| Bright chroma and perceivable difference ΔE after display compensation | 1 | 3.6476 | 0.2846 | 0.2963 | 0.00 | 1 | 26.792 | 0.2887 | 0.2987 | 0.00 | 1 | 146.97 | 0.2867 | 0.2967 | 0.00 | 1 | 583.54 | 0.2868 | 0.2973 | 0.00 |
| | 2 | 3.7372 | 0.291 | 0.3093 | 0.96 | 2 | 24.649 | 0.291 | 0.3024 | 1.11 | 2 | 136.62 | 0.2867 | 0.2964 | 1.32 | 2 | 546.37 | 0.2848 | 0.2971 | 1.44 |
| | 3 | 4.3414 | 0.2869 | 0.2988 | 0.90 | 3 | 26.463 | 0.2893 | 0.3005 | 3.6 | 3 | 138.28 | 0.2861 | 0.2966 | 1.23 | 3 | 547.3 | 0.2866 | 0.2981 | 1.55 |
| | 4 | 4.1075 | 0.2882 | 0.3014 | 0.77 | 4 | 25.914 | 0.2897 | 0.3009 | 3.56 | 4 | 138.57 | 0.2869 | 0.2953 | 1.17 | 4 | 562.36 | 0.2867 | 0.2974 | 1.23 |
| | 5 | 3.1696 | 0.2876 | 0.2983 | 0.71 | 5 | 25.619 | 0.2895 | 0.2986 | 3.70 | 5 | 146.17 | 0.2865 | 0.2984 | 0.13 | 5 | 574.22 | 0.286 | 0.2965 | 0.46 |
| | 6 | 3.6969 | 0.2861 | 0.294 | 0.31 | 6 | 26.646 | 0.2883 | 0.2972 | 3.31 | 6 | 146.43 | 0.2868 | 0.2962 | 0.20 | 6 | 573.12 | 0.2861 | 0.2976 | 0.53 |
| | 7 | 7.7866 | 0.2878 | 0.2933 | 4.81 | 7 | 37.6 | 0.2892 | 0.2969 | 3.92 | 7 | 163.54 | 0.2865 | 0.2933 | 2.06 | 7 | 591.34 | 0.2847 | 0.296 | 0.92 |
| | 8 | 8.0441 | 0.2872 | 0.2922 | 4.36 | 8 | 38.309 | 0.2881 | 0.2947 | 4.22 | 8 | 162.73 | 0.2869 | 0.293 | 2.91 | 8 | 589.71 | 0.286 | 0.2953 | 0.88 |
| | 9 | 8.5674 | 0.2865 | 0.2896 | 4.35 | 9 | 39.147 | 0.2878 | 0.2944 | 4.50 | 9 | 166.17 | 0.2864 | 0.2916 | 2.45 | 9 | 592.97 | 0.2846 | 0.2943 | 1.35 |

| | | Lv(cd/m²) | x | y | ΔE | | Lv(cd/m²) | x | y | ΔE | | Lv(cd/m²) | x | y | ΔE | | Lv(cd/m²) | x | y | ΔE |
|---|---|---|---|---|---|---|---|---|---|---|---|---|---|---|---|---|---|---|---|---|
| Bright chroma and perceivable difference ΔE sequentially after backlight compensation and display compensation | 1 | 3.42617 | 0.284003 | 0.29269 | 0.00 | 1 | 26.42846 | 0.288648 | 0.296067 | 0.00 | 1 | 147.6089 | 0.286472 | 0.296407 | 0.00 | 1 | 583.0575 | 0.286356 | 0.297292 | 0.00 |
| | 2 | 3.39418 | 0.289275 | 0.303001 | 1.48 | 2 | 24.60651 | 0.290851 | 0.302043 | 1.26 | 2 | 140.327 | 0.286461 | 0.297036 | 0.98 | 2 | 579.1299 | 0.284992 | 0.297714 | 0.53 |
| | 3 | 3.829629 | 0.284391 | 0.296386 | 0.76 | 3 | 26.30652 | 0.289618 | 0.30142 | 0.75 | 3 | 141.9333 | 0.28609 | 0.296463 | 0.91 | 3 | 576.8396 | 0.286229 | 0.298277 | 0.33 |
| | 4 | 3.98307 | 0.295233 | 0.299467 | 1.11 | 4 | 26.00164 | 0.289796 | 0.300111 | 0.41 | 4 | 143.1934 | 0.286809 | 0.295126 | 0.73 | 4 | 592.968 | 0.286013 | 0.296984 | 0.41 |
| | 5 | 3.218736 | 0.286682 | 0.298445 | 0.78 | 5 | 25.43966 | 0.289392 | 0.299019 | 0.43 | 5 | 143.9079 | 0.286841 | 0.295799 | 0.56 | 5 | 586.7523 | 0.284909 | 0.296095 | 0.73 |
| | 6 | 3.738843 | 0.285008 | 0.293429 | 0.37 | 6 | 26.7196 | 0.288414 | 0.297422 | 0.20 | 6 | 146.3923 | 0.286796 | 0.296943 | 0.41 | 6 | 573.1167 | 0.285644 | 0.296925 | 0.54 |
| | 7 | 4.057721 | 0.296364 | 0.300262 | 1.60 | 7 | 28.93869 | 0.289186 | 0.296682 | 1.14 | 7 | 150.1751 | 0.285231 | 0.292913 | 1.26 | 7 | 547.6178 | 0.284247 | 0.294978 | 1.13 |
| | 8 | 4.147365 | 0.289695 | 0.295267 | 1.81 | 8 | 27.4489 | 0.28868 | 0.294464 | 1.17 | 8 | 149.2833 | 0.285221 | 0.292854 | 1.19 | 8 | 564.8463 | 0.286059 | 0.296374 | 1.13 |
| | 9 | 4.085974 | 0.29633 | 0.304591 | 1.38 | 9 | 27.39784 | 0.28794 | 0.293624 | 1.24 | 9 | 148.4863 | 0.285296 | 0.292859 | 1.18 | 9 | 570.0809 | 0.284197 | 0.294023 | 1.38 |

FIG. 9

DISPLAY COMPENSATION METHOD AND LIQUID CRYSTAL DISPLAY DEVICE

FIELD OF INVENTION

The present application relates to a field of display technologies, especially to a display compensation method and a liquid crystal display device.

BACKGROUND OF INVENTION

For a display panel having poor brightness uniformity, a brightness difference among regions is excessively large. During compensation of brightness of the display panel, not only uniformity of compensated brightness is considered to achieve specified index, but also grayscale transition continuity of a screen image is considered satisfied.

However, most conventional brightness compensation solutions only compensate display brightness of a display panel, and such solution cannot satisfy improvement of brightness uniformity while guaranteeing grayscale transition continuity of a screen image, which brings display issues.

SUMMARY OF INVENTION

Technical Issue

The present application provides a display compensation method and a liquid crystal display device to ease a technical issue that grayscale transition continuity of a screen image cannot be satisfied while brightness uniformity is improved.

Technical Solution

In a first aspect, the present application provides a display compensation method, the display compensation method comprises: obtaining first subject display brightness and first actual display brightness of each of display partitions; determining a backlight compensation table based on a brightness difference between the first subject display brightness and the first display brightness of each of the display partitions; compensating backlight brightness of backlight partitions according to the backlight compensation table; obtaining second subject display brightness and second actual display brightness of each of the display partitions compensated by the backlight compensation table; determining a display compensation table based on a brightness difference between the second subject display brightness and the second actual display brightness of each of the display partitions; and compensating display brightness of the display partitions according to the display compensation table.

In a second aspect, the present application provides a display compensation method, the display compensation method comprises: compensating backlight brightness of backlight partitions according to a backlight compensation table; and compensating display brightness of display partitions according to a display compensation table.

In a third aspect, the present application provides a liquid crystal display device, the liquid crystal display device comprises a display driver board, a display panel, a backlight module, and a backlight driver board; the display driver board comprises a storage module, the storage module is configured to store the display compensation table of at least one of the above embodiments; display panel connected to the display driver board; the backlight module configured to provide backlight brightness correspondingly; and the backlight driver board connected to the backlight module, wherein the backlight driver board comprises a compensation unit and a storage unit, the compensation unit is connected to the storage unit, the storage unit is configured to store the backlight compensation table in the display compensation method according to claim 1, and the compensation unit is configured to call the backlight compensation table during operation.

Advantages

The display compensation method and the liquid crystal display device provided by the present application, adjusts backlight brightness corresponding to backlight partitions by a backlight compensation table, therefore can roughly adjust a brightness difference of the display panel, and can also improve a contrast of a screen image, which advantages for guaranteeing grayscale transition continuity of a screen image; also, adjusting by a display compensation table adjusts grayscale data corresponding to the display partitions can achieve fine adjustment of the brightness difference of the display panel such that uniformity of the display brightness can be further increased.

DESCRIPTION OF DRAWINGS

FIG. 9 is a schematic view of a contrast of related experimental data provided by the embodiment of the present application.

DETAILED DESCRIPTION OF PREFERRED EMBODIMENTS

To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

Figure 1:
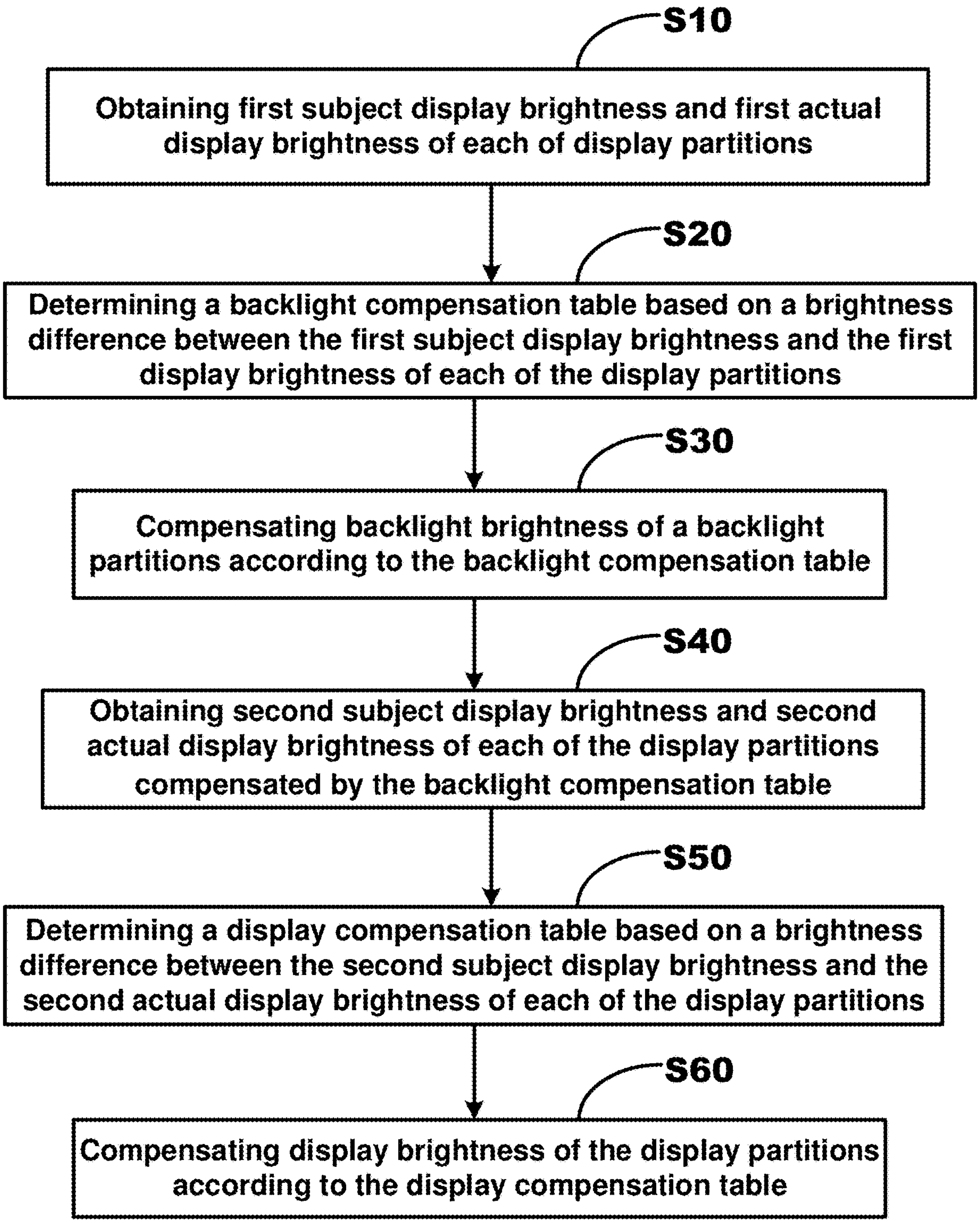
FIG. 1 is a schematic flowchart of a display compensation method provided by the embodiment of the present application.

Because the above-mentioned technical issue unable to satisfy brightness uniformity while guaranteeing grayscale transition continuity of a screen image, the present embodiment provides a display compensation method, as shown in FIGS. 1 to 9. With reference to FIG. 1, the display compensation method comprises steps as follows:

A step S10 comprises: obtaining first subject display brightness and first actual display brightness of each of display partitions.

A step S20: determining a backlight compensation table based on a brightness difference between the first subject display brightness and the first display brightness of each of the display partitions.

A step S30 comprises: compensating backlight brightness of backlight partitions according to the backlight compensation table.

A step S40 comprises: obtaining second subject display brightness and second actual display brightness of each of the display partitions compensated by the backlight compensation table.

A step S50 comprises: determining a display compensation table based on a brightness difference between the second subject display brightness and the second actual display brightness of each of the display partitions.

A step S60 comprises: compensating display brightness of the display partitions according to the display compensation table.

It can be understood that the display compensation method and the liquid crystal display device provided by the present embodiment, adjusts backlight brightness corresponding to backlight partitions by a backlight compensation table, therefore can roughly adjust a brightness difference of the display panel, and can also improve a contrast of a screen image, which advantages for guaranteeing grayscale transition continuity of a screen image; also, adjusting by a display compensation table adjusts grayscale data corresponding to the display partitions can achieve fine adjustment of the brightness difference of the display panel such that uniformity of the display brightness can be further increased.

It should be explained that the present embodiment first compensates backlight brightness corresponding to the backlight partition according to the backlight compensation table, then compensates grayscale data corresponding to the display partition according to the display compensation table. It is one of improvement points of the present application on time sequence compensation. It can be understood that such implementation sequence would achieve better improvement effects.

Such technology of compensating grayscale data corresponding to the display partition according to the display compensation table can also be called brightness demura algorithm, and it can perform corresponding compensation to uneven brightness of the display panel and can improve a display effect. Specific processes of the brightness demura algorithm can be but are limited to: dividing a display region into non-overlapping region of a number N, and adjusting brightness of the entire display region uniformly on a basis of brightness of a central region. A compensation logic can be using a camera to collect display brightness distribution of the display panel. When display brightness of a certain region is detected to be higher or lower than display brightness of a central region, display brightness of the central region and the region would be calculated by a weighting process to obtain a target value of the region, as indicated by a formula (1):

$$W = N * \text{CENTER} + (1 - N) * \text{OTHER} \quad (1)$$

Center refers to display brightness of the central region; other refers to display brightness of one of other regions; N refers to a brightness weighting coefficient; and W refers to target brightness corresponding to one of other regions. It can be understood that the center can also refer to display brightness of a specific region.

Namely, target brightness corresponding to an outer periphery display partition is obtained according to the second subject display brightness, the second actual display brightness, and the brightness weighting coefficient, namely, it can be obtained according to a formula W=N*CENTER+(1−N)*OTHER. The CENTER, OTHER, N, and W sequentially are the second subject display brightness, the second actual display brightness, the brightness weighting coefficient, and the target brightness.

Selection of the N value would directly affect the compensation effect. For the display panel with a poor effect of in-plane uniformity, a brightness difference between brightness of the central region and other region is large. When N is selected to be near 1 to make brightness of regions approach the brightness of the central point near, brightness compensation data of a brightness mura region is too large and results in transition discontinuity of grayscale of a screen image after mura region compensation. When N is selected to be too small, it would result in failure of achievement of a compensated brightness uniformity index. For example, for a single-ended-drive product, i.e, chip on film (Chip On Flex/Chip On Film, COF) on a single side of a display region, because of RC Delay, a COF proximal end is charged sufficiently such that brightness of the COF proximal end is high; a COF distal end is charged insufficiently such that brightness of the COF distal end is low, which makes a in-plane brightness difference hug. Therefore, when the single-ended-drive product is only processed by a demura algorithm, an issue unable to satisfy improvement of brightness uniformity while guaranteeing grayscale transition continuity of a screen image would occur, which affects optical quality of the product. As such, the present embodiment, by divisionally adjusting entire backlight brightness, not only improves adjustment ability of the backlight, but also increases influence of the backlight brightness to the display brightness/grayscale data, which further increases screen image contrast to further guarantee grayscale transition continuity of a screen image.

It should be explained that a difference of the target value and an actual brightness value of the region is used as a brightness compensation value of the region, as so on, to obtain brightness compensation values of different regions. Collection of brightness compensation values of the different regions can obtain the above display compensation table. Then, implementing the display compensation table during operation of the display panel can optimize minorly uneven brightness.

Backlight brightness of each of the backlight partitions can be adjusted individually to improve flexibility of adjustment of the backlight brightness. Backlight brightness of each of the backlight partitions can be adjusted by at least one of voltage, current, light emitting time, and duty ratio to obtain backlight brightness of different backlight partitions in the present embodiment.

The backlight partition is one partition of the light emitting region of the backlight module, and the backlight brightness is brightness corresponding to the backlight partition.

The display partition is one partition of the display region of the display panel, and the display brightness is brightness corresponding to the display partition. It can be understood that each of the display partitions can comprise one or more pixels. Preferably, each of the display partitions comprises a plurality of pixels arranged in an array.

Figure 2:
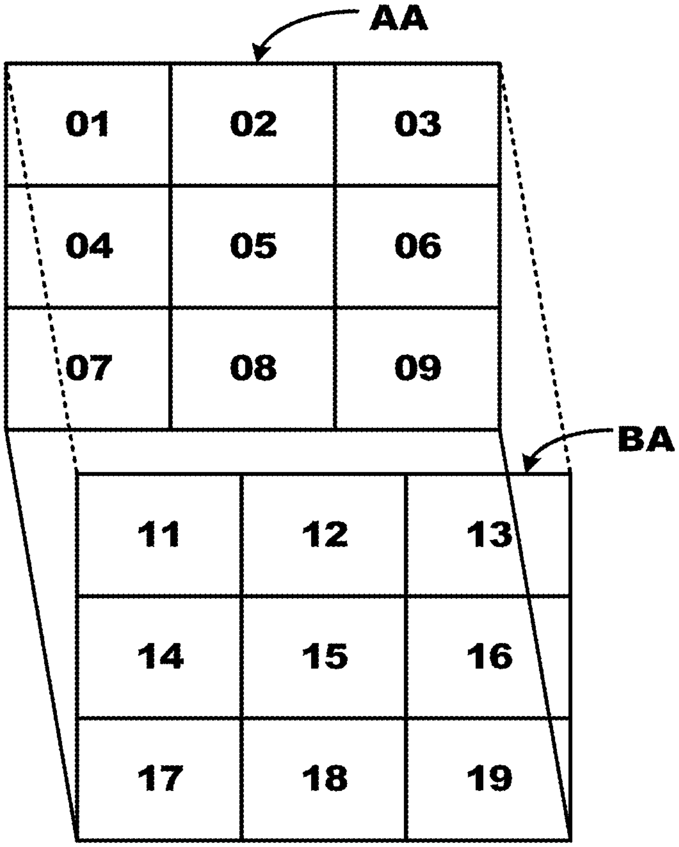
FIG. 2 is a schematic structural view of display partitions and backlight partitions provided by the embodiment of the present application.

For the backlight partitions in a correspondence relationship or a mapping relationship, the display partitions overlap one another along a thickness direction of the display device, or, the backlight partitions provides the display partitions in the correspondence relationship or the mapping relationship with backlight brightness correspondingly. With reference to FIG. 2, the display region AA comprises a display partition 01 to a display partition 09, and the backlight region BA comprises a backlight partition 11 to a backlight partition 19. The backlight partition 11 to the backlight partition 19 provide backlight brightness corresponding to the display partition 01 to the display partition 09 respectively.

In one of the embodiments, the above step S20 comprises: establishing a mapping relationship between backlight partitions and the display partitions, wherein for the backlight partitions in the mapping relationship, the display partitions overlap one another along a backlight emitting direction; calculating a brightness difference between the first subject display brightness and the first actual display brightness of the display partition; determining the brightness difference as a backlight brightness compensation value of the backlight partition corresponding to the display partition; and obtaining backlight brightness compensation values of the backlight partitions corresponding to all of the display partitions to form the backlight compensation table.

It should be explained that in the same mapping relationship, one backlight partitions can correspond to one or more display partitions, namely, compared to an area of the backlight partition, an area of the display partition can be smaller such that during compensation by the display compensation table, a fine compensation degree of display brightness of the display partition can be enhanced.

Using a brightness difference between display brightness of different partitions of the display panel and the subject display brightness as a corresponding backlight brightness compensation value can better improve a contrast of a display screen image. The greater the contrast is, the better the grayscale transition continuity is such that under effect of bidirectional compensation not only uniformity of the display brightness can be improved but also grayscale transition continuity of a screen image can be guaranteed.

In one of the embodiments, the steps of calculating a brightness difference between the first subject display brightness and the first actual display brightness of the display partition, and determining the brightness difference as a backlight brightness compensation value of the backlight partition corresponding to the display partition, further comprise: determining a backlight brightness compensation value of at least a specific one of the backlight partitions; obtaining the backlight brightness compensation values of others of backlight partitions except for the at least specific one of the backlight partitions by an interpolation process according to the backlight brightness compensation value of the at least specific one of the backlight partitions; and the step of obtaining backlight brightness compensation values of the backlight partitions corresponding to all of the display partitions to form the backlight compensation table, further comprises: collecting the backlight brightness compensation value of the at least specific one of the backlight partitions and the backlight brightness compensation values of others of the backlight partitions to form the backlight compensation table.

In particular, the at least specific one of the backlight partitions can be one or some of all of the backlight partitions. Others of the backlight partitions can be the remaining backlight partitions of all of the backlight partitions. Either the at least specific one of the backlight partitions or other of the backlight partitions can be designated according to demands. The brightness compensation value of the at least specific one of the backlight partitions is a brightness difference between the first subject display brightness and the first actual display brightness of the display partition corresponding to the at least specific one of the backlight partitions.

The backlight compensation table can comprise different backlight compensation values of difference ones of the backlight partitions. These backlight compensation values cab be distributed in the backlight compensation table in a certain form, for example, one row and multiple columns, multiple rows and one column, or multiple rows and multiple columns. Each of the backlight compensation values can be one brightness datum, for example, 0.5 nit, 1.0 nit, 2 nit, or 5 nit. After converting the backlight compensation value or directly superposing backlight compensation value on the original backlight data, the backlight driver board adjusts final backlight brightness of the backlight partition according to a superposition result.

It should be explained that the present embodiment can generate the backlight brightness compensation values of all of the backlight partitions by smaller backlight brightness compensation value, which can reduce a number of backlight brightness compensation values of others of the backlight partitions required during early exploration, and also reduce complexity of manufacturing processes for the backlight compensation table.

It should be explained that types of interpolation processes in related art are great, an improver of the technical solution can adaptively choose a corresponding interpolation process according to particularity of a technical solution itself. The inventive concept of the present embodiment is only acquired by paying creative effort on the basis of a person of ordinary skill.

In one of the embodiments, the step of determining a backlight compensation table according to a brightness difference between the first subject display brightness and the first display brightness of each of the display partitions, further comprises: determining a type of a display grayscale of a frame to be displayed; according to the type of the display grayscale of the frame to be displayed calling a corresponding one of the backlight sub-compensation tables.

In particular, backlight compensation table can comprise two of backlight sub-compensation tables such as a low grayscale backlight sub-compensation table, a middle grayscale backlight sub-compensation table, and a high grayscale backlight sub-compensation table, for example, the low grayscale backlight sub-compensation table and the middle grayscale backlight sub-compensation table, or, the low grayscale backlight sub-compensation table and the high grayscale backlight sub-compensation table, or, the middle grayscale backlight sub-compensation table or the high grayscale backlight sub-compensation table.

The display grayscale of the frame to be displayed corresponds to an average brightness of the frame to be displayed, and the average brightness of the frame to be displayed is equal to a sum of brightness of sub-pixels divided by a number of the sub-pixels in the frame to be displayed.

It should be explained that the present embodiment divides the backlight compensation table into two backlight sub-compensation tables corresponding to different grayscale ranges. Calling a corresponding one of the grayscale backlight sub-compensation tables according to the type of the display grayscale of the frame to be displayed can more precisely compensate the display brightness.

In one of the embodiments, display compensation method further comprises: configuring the backlight compensation table to comprises a low grayscale backlight sub-compensation table, a middle grayscale backlight sub-compensation table, and a high grayscale backlight sub-compensation table; determining a type of a display grayscale of a frame to be displayed; and calling a corresponding one of the backlight sub-compensation tables according to the type of the display grayscale of the frame to be displayed.

It should be explained that the present embodiment divides the backlight compensation table into three backlight sub-compensation table corresponding to different grayscale ranges, calling a corresponding one of the grayscale backlight sub-compensation tables according to the type of the display grayscale of the frame to be displayed can further more precisely compensate display brightness.

In one of the embodiments, display compensation method further comprises: configuring the type of the display grayscale of the frame to be displayed to comprise a low grayscale, a middle grayscale, and a high grayscale; determining the type of the display grayscale of the frame to be displayed to belong to the low grayscale; and calling the low grayscale backlight sub-compensation table.

It should be explained that the present embodiment calling low grayscale backlight sub-compensation table according to a condition of the type of the display grayscale of the frame to be displayed being the low grayscale can further more precisely compensate display brightness.

In one of the embodiments, display compensation method further comprises: configuring the type of the display grayscale of the frame to be displayed to comprises a low grayscale, a middle grayscale, and a high grayscale; determining the type of the display grayscale of the frame to be displayed to belong to the middle grayscale; and calling middle grayscale backlight sub-compensation table.

It should be explained that the present embodiment calling middle grayscale backlight sub-compensation table according to a condition of the type of the display grayscale of the frame to be displayed being the middle grayscale can further more precisely compensate display brightness.

In one of the embodiments, display compensation method further comprises: configuring the type of the display grayscale of the frame to be displayed to comprise a low grayscale, a middle grayscale, and a high grayscale; determining the type of the display grayscale of the frame to be displayed to belong to the high grayscale; and calling high grayscale backlight sub-compensation table.

It should be explained that the present embodiment calling high grayscale backlight sub-compensation table according to a condition of the type of the display grayscale of the frame to be displayed being the high grayscale can further more precisely compensate display brightness.

In one of the embodiments, after the step of compensating backlight brightness of backlight partitions according to the backlight compensation table, the method further comprises: smoothing the backlight brightness of each of the backlight partitions.

It should be explained that smoothing the backlight brightness after compensation by the backlight compensation table can further adjust a reasonable distribution of backlight brightness integrally to further reduce the display brightness difference.

In one of the embodiments, display compensation method further comprises: configuring each of the display partitions to comprise a central display partition and a plurality of outer periphery display partitions; structuring the a plurality of outer periphery display partitions to surround the central display partition; and determining the display brightness of the central display partition as the first subject display brightness and the display brightness of the central display partition compensated by the backlight compensation table as the second subject display brightness.

It can be understood that first subject display brightness can be any display brightness able to improve display region brightness uniformity. The present embodiment serving the display brightness of the central display partition as the first subject display brightness more fits the demands of the single-ended-drive product. Serving the display brightness of the central display partition as the first subject display brightness allows any of a vertical direction and/or a horizontal direction of the display panel to be the central region, value selection would be appropriate. No excessive adjustment is needed during compensation for approximating to brightness uniformity.

In one of the embodiments, the step of determining a display compensation table based on a brightness difference between the second subject display brightness and the second actual display brightness of each of the display partitions, comprises: determining a brightness weighting coefficient of each of the outer periphery display partitions; obtaining target brightness corresponding to the outer periphery display partitions according to the second subject display brightness, the second actual display brightness, and the brightness weighting coefficient; determining differences between the target brightness of the outer periphery display partitions and the second actual display brightness as display brightness compensation values of the outer periphery display partitions; and collecting the display brightness compensation value of each of the outer periphery display partitions as the display compensation table.

Figure 3:
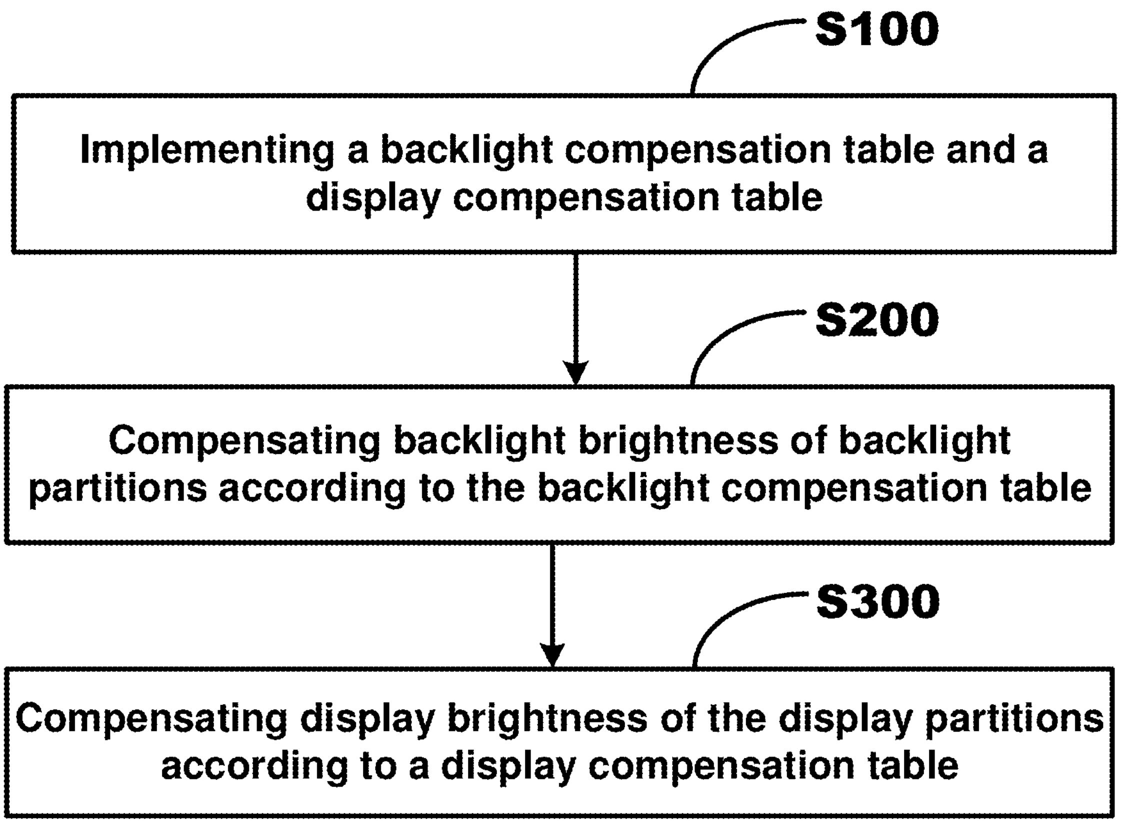
FIG. 3 is another schematic flowchart of the display compensation method provided by the embodiment of the present application.

In one of the embodiments, with reference to FIG. 3, the present embodiment provides a display compensation method, the display compensation method comprises steps as follows:

A step S100 comprises: implementing a backlight compensation table and a display compensation table.

A step S200 comprises: compensating backlight brightness of backlight partitions according to the backlight compensation table.

A step S300 comprises: compensating display brightness of the display partitions according to a display compensation table.

It should be explained that the technical solution as shown in FIG. 1 is characterized in comparison of the backlight compensation table to the display compensation table. The present embodiment stores the manufactured backlight compensation table and display compensation table in a liquid crystal display device. The display device, when electrically initialized completely and entering a display state, starts to implement the backlight compensation table and the display compensation table. During implementation of the backlight compensation table and the display compensation table, the display compensation method provided by the present embodiment adjusts backlight brightness corresponding to backlight partitions by a backlight compensation table, therefore can roughly adjust a brightness difference of the display panel, and can also improve a contrast of a screen image, which advantages for guaranteeing grayscale transition continuity of a screen image; also, adjusting by a display compensation table adjusts grayscale data corresponding to the display partitions can achieve fine adjustment of the brightness difference of the display panel such that uniformity of the display brightness can be further increased.

It should be explained that the above fly step S100 is Optional. Namely, the step S200 and the step S300 can be performed directly without the step S100. According to the present application, it can also improve uniformity of the display brightness.

In particular, display device can obtain original backlight data and original display data during operation, then superpose backlight compensation data in the backlight compensation table to the original backlight data to control backlight brightness, and superpose the display compensation data in the display compensation table to the original display data to control display brightness. It can be understood that the original backlight data and/or backlight compensation data can be configured to adjust backlight brightness. The original display data and/or display compensation data can be configured to adjust display brightness.

In one of the embodiments, the display compensation table is determined according to subject display brightness of the backlight compensation table after backlight compensation and actual display brightness corresponding to the display partitions.

It should be explained that the present embodiment provides explanation to sequence of manufacture of the backlight compensation table and the display compensation table and internal logic. It can be understood that it facilitates simultaneously improving uniformity of display brightness and grayscale transition continuity of a screen image.

In one of the embodiments, display compensation method further comprises: compensating the backlight brightness of the backlight partitions according to the backlight compensation table first; and then compensating the display brightness of the display partitions according to the display compensation table.

It should be explained that the backlight compensation table, the implementation sequence of the display compensation table can be no sequence or simultaneousness, and implementing the backlight compensation table first and then implementing the display compensation table later can be a preferred embodiment.

Figure 4:
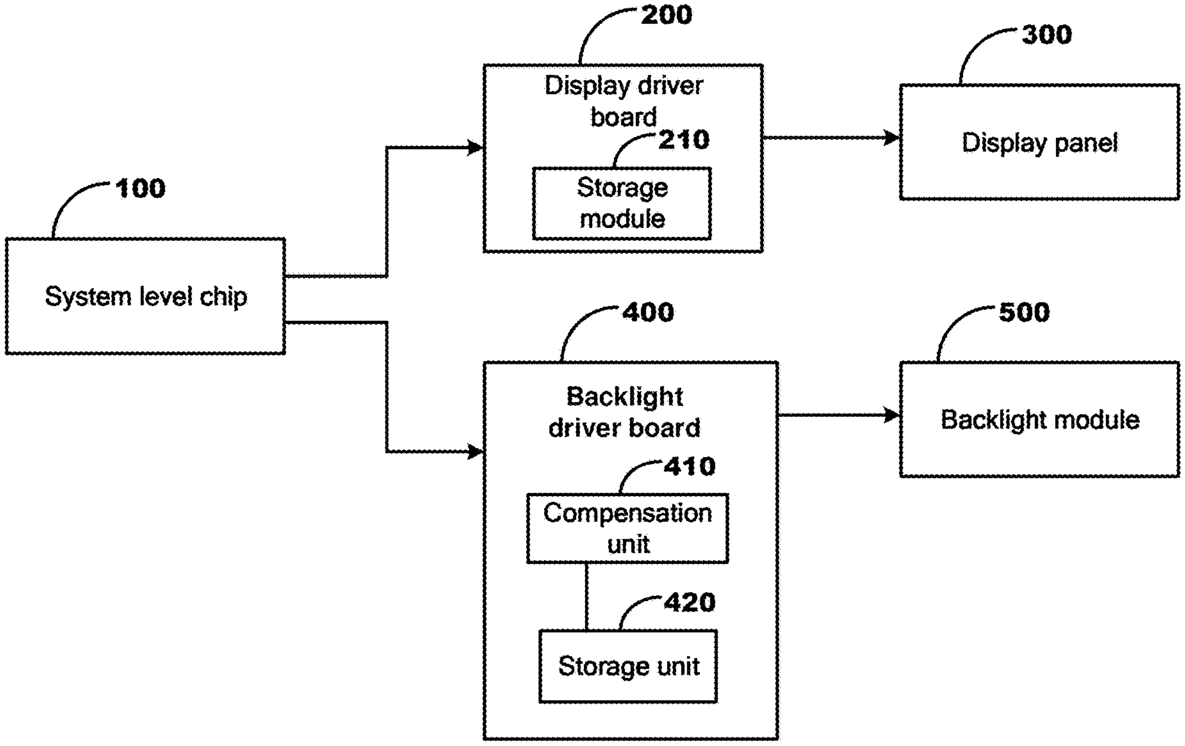
FIG. 4 is a schematic structural view of a liquid crystal display device provided by the embodiment of the present application.

In one of the embodiments, with reference to FIG. 4, the present embodiment provides a liquid crystal display device, the liquid crystal display device comprises a display driver board 200, a display panel 300, a backlight driver board 400, and a backlight module 500. The display driver board 200 comprises a storage module 210. The storage module 210 is configured to store the display compensation table of at least one of the above embodiments. The display panel 300 is connected to the display driver board 200. The backlight driver board 400 is connected to the backlight module 500. The backlight driver board 400 comprises a compensation unit 410 and a storage unit 420. The compensation unit 410 is connected to the storage unit 420. The backlight module 500 is configured to provide backlight brightness correspondingly. The storage unit 420 is configured to store the backlight compensation table in at least one of the above embodiments. The compensation unit 410 is configured to provide a calling backlight compensation table during operation.

It can be understood that the liquid crystal display device provided by the present embodiment, adjusts backlight brightness corresponding to backlight partitions by a backlight compensation table, therefore can roughly adjust a brightness difference of the display panel 300, and can also improve a contrast of a screen image, which advantages for guaranteeing grayscale transition continuity of a screen image; also, adjusting by a display compensation table adjusts grayscale data corresponding to the display partitions can achieve fine adjustment of the brightness difference of the display panel 300 such that uniformity of the display brightness can be further increased.

Any one of the storage unit 420 and the storage module 210 can be a storage chip, for example, it can be a flash memory.

In one of the embodiments, the liquid crystal display device further comprises a system level chip 100, the system level chip 100 is connected to the display driver board 200 and the backlight driver board 400.

In one of the embodiments, backlight driver board 400 compensates the backlight brightness according to the backlight compensation table, and the display driver board compensates display brightness of the display panel 300 according to the display compensation table.

In one of the embodiments, the backlight compensation table is configured to decrease the brightness difference of the display panel 300 and increase a screen image contrast of the display panel 300. The display compensation table is configured to decrease a brightness difference of the display panel 300.

In one of the embodiments, a backlight region of the backlight module 500 comprises a plurality of backlight partitions, and the backlight driver board 400 adjusts backlight brightness of at least one of the backlight partitions according to the backlight compensation table.

In one of the embodiments, a display region of the display panel 300 comprises a plurality of display partitions, each of the backlight partitions provides at least one of the display partitions with backlight brightness correspondingly.

Figure 5:
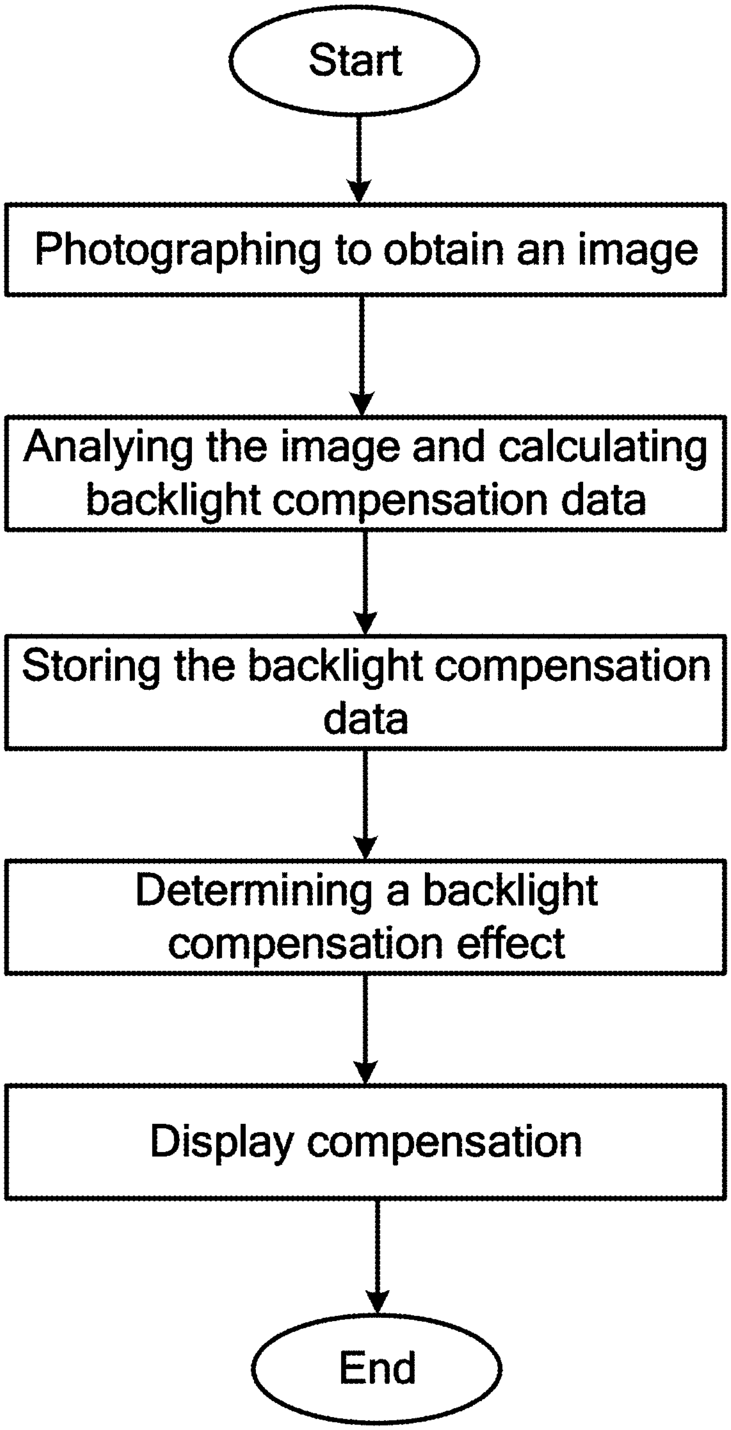
FIG. 5 is still another schematic flowchart of the display compensation method provided by the embodiment of the present application.

It should be explained that an invention concept of the above display compensation method can refer to FIG. 5. First, an image displayed by the display panel is photographed and captured, then the image is analyzed to obtain coordinates and brightness value corresponding to the sub-pixels such that calculation is performed according to some steps of the above display compensation method to obtain backlight compensation data. Then, the backlight compensation data of each of the sub-pixels is collected to obtain a corresponding backlight compensation table, namely, the backlight compensation data. Then, a backlight compensation effect is determined. When the backlight compensation effect does not match a predetermined index, then the backlight compensation steps of the above method are implemented repeatedly until the index is achieved. When the backlight compensation effect matches the predetermined index, the display compensation, i.e., the demura algorithm is implemented. It can be understood that during such process, both the backlight compensation and the display compensation are required to be implemented for obtaining the technical effect corresponding to embodiments of the present application.

It should be explained that the demura algorithm and the backlight compensation shown in FIG. 5, can have no sequence during manufacture. Preferably, synchronous implementation of both can obtain the best display effect.

Figure 6:
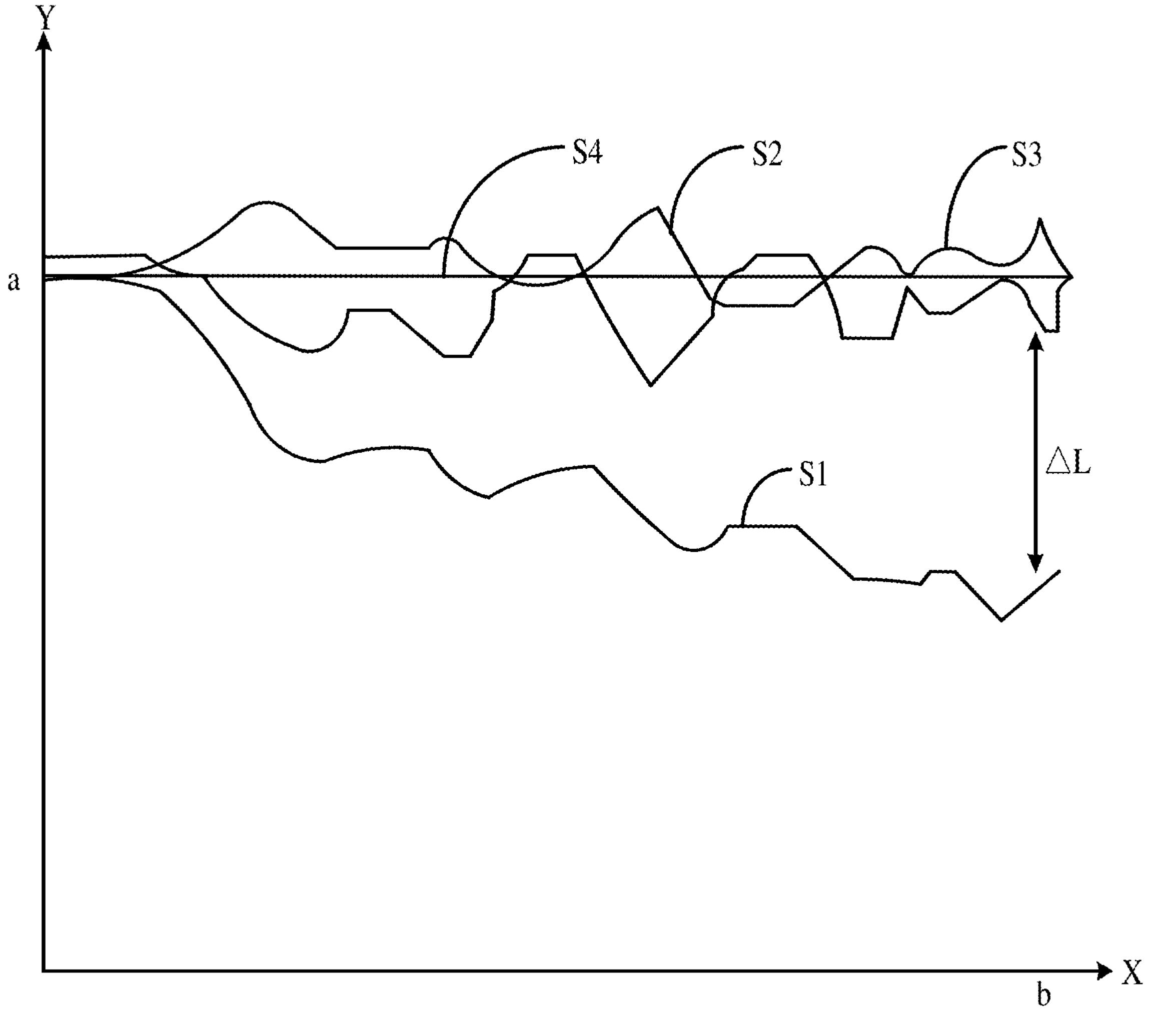
FIG. 6 is a schematic view of a waveform of the display compensation method provided by the embodiment of the present application.

FIG. 6 is a schematic view of a waveform of the display compensation method provided by the embodiment of the present application. A curve S1 is a display brightness waveform trend before any compensation, a curve S2 is a display brightness waveform trend after backlight compensation on the basis of the curve S1, a curve S3 is a display brightness waveform trend after display compensation, a curve S4 is a set subject display brightness. It should be explained that after backlight compensation shown by the curve S2 and display compensation shown by the curve S3, brightness of the display panel can achieve a comparatively constant or unchanged display brightness the curve S4, which improves uniformity of the display brightness.

With reference to FIG. 6, X refers to a position, wherein X=0 refers to a central point of the central region of the display panel, Y refers to a pure grayscale brightness distribution of the display panel. The curve S1 refers to an original brightness distribution. The curve S4 refers to subject display brightness. It can be seen that with X moving away from X=0, a distance corresponding to the brightness central point becomes greater, and the brightness of a corresponding region becomes lower, and directly applying compensation by the demura algorithm results in grayscale transition discontinuity of the screen image. The present application first by backlight compensation raises a brightness value shown by the curve S1 to a brightness value shown by the curve S2, and then by the demura algorithm precisely adjusts uneven brightness, for example adjusting bright brightness to dark brightness, adjusting dark brightness to bright brightness. An amount of compensation of the demura algorithm is as the curve S2, Namely, backlight compensation on the basis of the curve S1 can adjust the brightness value to that shown by the curve S2, and then brightness value shown by the curve S4 can be achieved with superposition of an amount of compensation of display compensation as shown by the curve S3.

Figure 7:
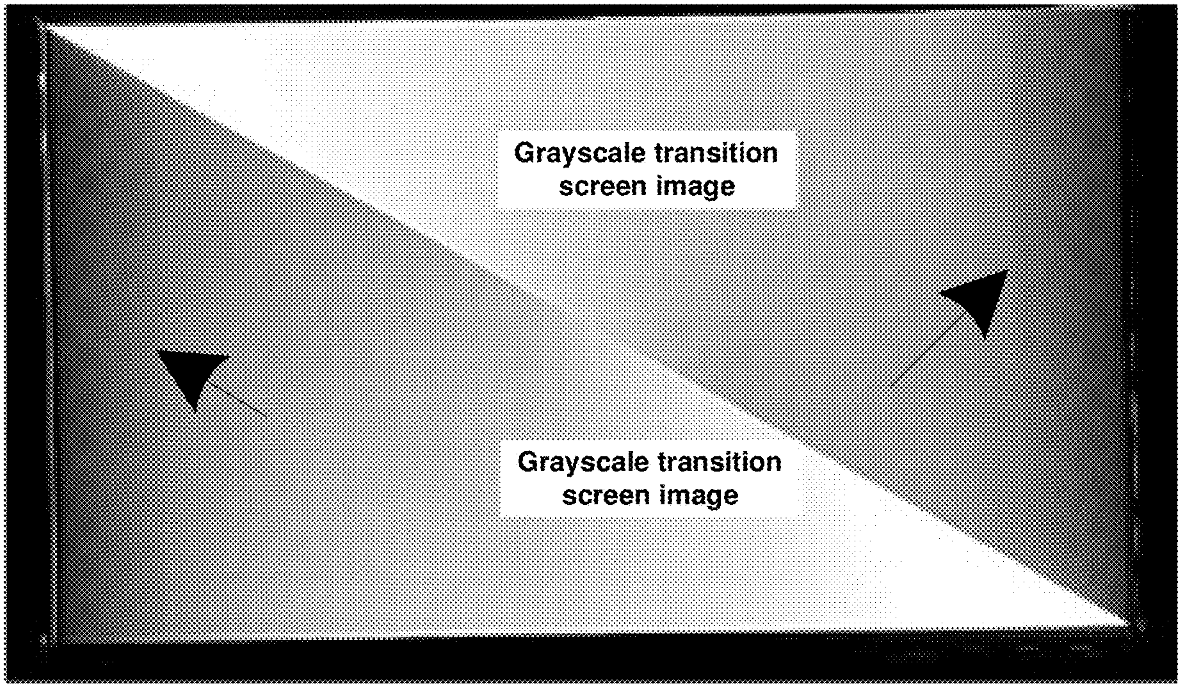
FIG. 7 is a schematic view of grayscale discontinuity of the display device of related art displaying a grayscale transition screen image.

Regarding the above technical issue unable to satisfy improvement of brightness uniformity while guaranteeing grayscale transition continuity of a screen image, discontinuity of the screen image middle grayscale transition is explained particularly. With reference to FIG. 7, the scale drop here also presents discontinuity of the grayscale transition. It can be seen that a region indicated by arrows on left and right sides of the display region has a clear black band, and a fault exists between a grayscale segmentation of the region in which black band exists and a grayscale segmentation of a region outside the black band such that the discontinuity of the grayscale transition becomes more obvious.

Figure 8:
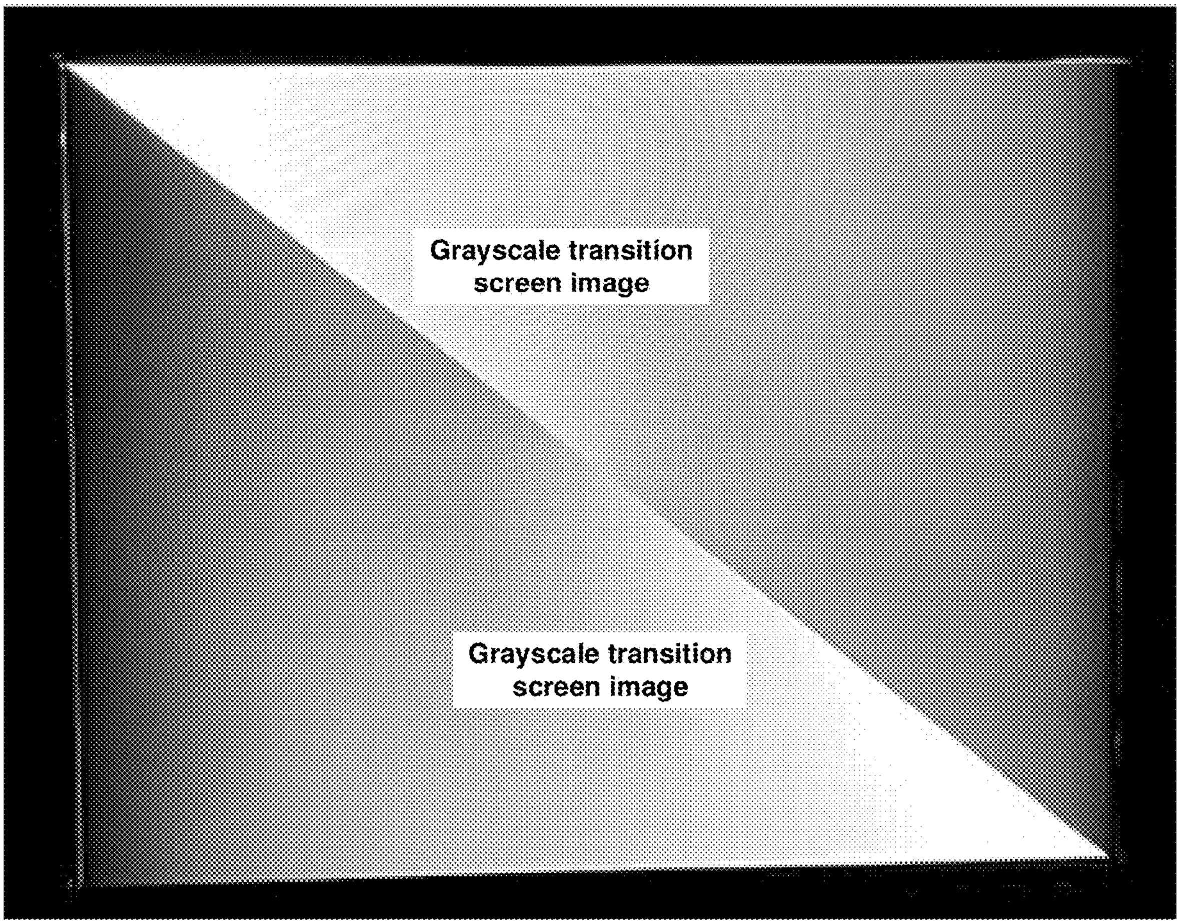
FIG. 8 is a schematic view of grayscale continuity of a screen image provided by the embodiment of the present application.

FIG. 8 is a schematic view of grayscale continuity of a screen image provided by the embodiment of the present application. It can be seen from FIG. 8 that obvious black bands exist on left ad right sides of the display region, a grayscale segmentation of the region in which the black band exists and a grayscale segmentation of the region outside the black band has comparatively minor grayscale continuity between two regions compared to the fault.

FIG. 9 is a schematic view of a contrast of related experimental data provided by the embodiment of the present application. 25, 60, 128, 240 shown in FIG. 9 are specific grayscales. X refers to an abscissa of a selected sub-pixel according to a corresponding grayscale, Y refers to an ordinate of a selected sub-pixel according to a corresponding grayscale. Data of an initial bright chroma and a perceivable difference ΔE as shown in a first table of FIG. 9 counted from top to bottom are brightness values of a specific sub-pixel by any compensation. A second table of FIG. 9 counted from top to bottom data of a bright chroma and a perceivable difference ΔE after display compensation are brightness values of the specific sub-pixel after display compensation data of a bright chroma and a perceivable difference ΔE of a third table of FIG. 9 counted from top to bottom sequentially after backlight compensation and display compensation is brightness values of the specific sub-pixel after display compensation and backlight compensation, it can be seen from FIG. 9 that perceivable difference ΔE of the first table, the second table, and the third table from top to bottom keep decreasing, which explains that after display compensation and backlight compensation, the brightness difference corresponding to the sub-pixel can be minimized.

The perceivable difference Δ E refers to a difference between a displayed color and an original color of an inputted content. The smaller the value is, the more accurate the color is, and the smaller the corresponding brightness difference. The greater the value is, the greater the color difference is, and the greater the corresponding brightness difference is.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A display compensation method, comprising:

obtaining first subject display brightness and first actual display brightness of each of display partitions;

determining a backlight compensation table based on a brightness difference between the first subject display brightness and the first display brightness of each of the display partitions;

compensating backlight brightness of backlight partitions according to the backlight compensation table;

obtaining second subject display brightness and second actual display brightness of each of the display partitions compensated by the backlight compensation table;

determining a display compensation table based on a brightness difference between the second subject display brightness and the second actual display brightness of each of the display partitions; and compensating display brightness of the display partitions according to the display compensation table.

2. The display compensation method according to claim 1, wherein the step of determining a backlight compensation table based on a brightness difference between the first subject display brightness and the first display brightness of each of the display partitions, comprises:

establishing a mapping relationship between the backlight partitions and the display partitions, wherein for the backlight partitions in the mapping relationship, the display partitions overlap one another along a backlight emitting direction;

calculating a brightness difference between the first subject display brightness and the first actual display brightness of the display partition;

determining the brightness difference as a backlight brightness compensation value of the backlight partition corresponding to the display partition; and obtaining backlight brightness compensation values of the backlight partitions corresponding to all of the display partitions to form the backlight compensation table.

3. The display compensation method according to claim 2, wherein the steps of calculating a brightness difference between the first subject display brightness and the first actual display brightness of the display partition, and determining the brightness difference as a backlight brightness compensation value of the backlight partition corresponding to the display partition, further comprise:

determining a backlight brightness compensation value of at least a specific one of the backlight partitions;

obtaining the backlight brightness compensation values of others of backlight partitions except for the at least specific one of the backlight partitions by an interpolation process according to the backlight brightness compensation value of the at least specific one of the backlight partitions; and the step of obtaining backlight brightness compensation values of the backlight partitions corresponding to all of the display partitions to form the backlight compensation table, further comprises:

collecting the backlight brightness compensation value of the at least specific one of the backlight partitions and the backlight brightness compensation values of others of the backlight partitions to form the backlight compensation table.

4. The display compensation method according to claim 1, wherein after the step of compensating backlight brightness of backlight partitions according to the backlight compensation table, the method further comprises:

smoothing the backlight brightness of each of the backlight partitions.

5. The display compensation method according to claim 1, wherein the display compensation method further comprises:

configuring each of the display partitions to comprise a central display partition and a plurality of outer periphery display partitions;

structuring the plurality of outer periphery display partitions to surround the central display partition; and determining the display brightness of the central display partition as the first subject display brightness and the display brightness of the central display partition compensated by the backlight compensation table as the second subject display brightness.

6. The display compensation method according to claim 5, wherein the step of determining a display compensation table based on a brightness difference between the second subject display brightness and the second actual display brightness of each of the display partitions, comprises:

determining a brightness weighting coefficient of each of the outer periphery display partitions;

obtaining target brightness corresponding to the outer periphery display partitions according to the second subject display brightness, the second actual display brightness, and the brightness weighting coefficient;

determining differences between the target brightness of the outer periphery display partitions and the second actual display brightness as display brightness compensation values of the outer periphery display partitions; and collecting the display brightness compensation value of each of the outer periphery display partitions as the display compensation table.

7. The display compensation method according to claim 6, wherein the step of obtaining target brightness corresponding to the outer periphery display partitions according to the second subject display brightness, the second actual display brightness, and the brightness weighting coefficient, comprises:

obtaining the target brightness according to a formula $W=N*CENTER+(1-N)*OTHER$;

wherein CENTER, OTHER, N, and W sequentially are the second subject display brightness, the second actual display brightness, the brightness weighting coefficient, and the target brightness.

8. The display compensation method according to claim 1, wherein the step of determining a backlight compensation table based on a brightness difference between the first subject display brightness and the first display brightness of each of the display partitions, further comprises:

determining a type of a display grayscale of a frame to be displayed; and calling a corresponding one of backlight sub-compensation tables according to the type of the display grayscale of the frame to be displayed.

9. The display compensation method according to claim 8, wherein before the step of determining a type of a display grayscale of a frame to be displayed, the method further comprises:

configuring the backlight compensation table to comprise at least two of a low grayscale backlight sub-compensation table, a middle grayscale backlight sub-compensation table, and a high grayscale backlight sub-compensation table.

10. The display compensation method according to claim 9, wherein the step of calling a corresponding one of backlight sub-compensation tables according to the type of the display grayscale of the frame to be displayed, comprises:

configuring the type of the display grayscale of the frame to be displayed to comprise a low grayscale, a middle grayscale, and a high grayscale;

determining the type of the display grayscale of the frame to be displayed to belong to the low grayscale; and calling the low grayscale backlight sub-compensation table.

11. The display compensation method according to claim 9, wherein the step of calling a corresponding one of backlight sub-compensation tables according to the type of the display grayscale of the frame to be displayed, comprises:

configuring the type of the display grayscale of the frame to be displayed to comprise a low grayscale, a middle grayscale, and a high grayscale;

determining the type of the display grayscale of the frame to be displayed to belong to the middle grayscale; and calling the middle grayscale backlight sub-compensation table.

12. The display compensation method according to claim 9, wherein the step of calling a corresponding one of backlight sub-compensation tables according to the type of the display grayscale of the frame to be displayed, comprises:

configuring the type of the display grayscale of the frame to be displayed to comprise a low grayscale, a middle grayscale, and a high grayscale;

determining the type of the display grayscale of the frame to be displayed to belong to the high grayscale; and calling the high grayscale backlight sub-compensation table.

13. A liquid crystal display device, comprising:

a display driver board comprising a storage module, wherein the storage module is configured to store the display compensation table in the display compensation method according to claim 1;

a display panel connected to the display driver board;

a backlight module configured to provide backlight brightness correspondingly; and a backlight driver board connected to the backlight module, wherein the backlight driver board comprises a compensation unit and a storage unit, the compensation unit is connected to the storage unit, the storage unit is configured to store the backlight compensation table in the display compensation method, and the compensation unit is configured to call the backlight compensation table during operation.

14. The liquid crystal display device according to claim 13, wherein the backlight compensation table is configured to decrease a brightness difference of the display panel and increase a screen image contrast of the display panel, and the display compensation table is configured to decrease a brightness difference of the display panel.

15. The liquid crystal display device according to claim 13, wherein a backlight region of the backlight module comprises a plurality of backlight partitions, and the backlight driver board adjusts the backlight brightness of at least one of the backlight partitions according to the backlight compensation table.

16. The liquid crystal display device according to claim 15, wherein a display region of the display panel comprises a plurality of display partitions, and the backlight partitions provides at least one of the display partitions with backlight brightness correspondingly.

17. A display compensation method, comprising:

compensating backlight brightness of backlight partitions according to a backlight compensation table; and compensating display brightness of display partitions according to a display compensation table, wherein the display compensation table is determined according to subject display brightness of the display partitions after backlight compensation implemented by the backlight compensation table after backlight compensation and according to actual display brightness corresponding to the display partitions.

* * * * *